United States Patent [19]
Rogers

[11] Patent Number: 6,052,360
[45] Date of Patent: Apr. 18, 2000

[54] NETWORK RESTORATION PLAN REGENERATION RESPONSIVE TO TRANSITORY CONDITIONS LIKELY TO AFFECT NETWORK TRAFFIC

[75] Inventor: James David Rogers, Larkspur, Colo.

[73] Assignee: MCI Communications Corporation, Washington, D.C.

[21] Appl. No.: 08/956,339

[22] Filed: Oct. 23, 1997

[51] Int. Cl.[7] .................................. H04J 1/16; H04J 3/14; H04L 1/00; H04L 12/26
[52] U.S. Cl. ........................... 370/216; 370/242; 370/254
[58] Field of Search ................................... 370/216, 217, 370/238, 242, 254, 255, 400, 244, 245; 340/827; 709/220, 221, 223, 224, 239, 242; 714/2, 30, 31, 47–48

[56] References Cited

U.S. PATENT DOCUMENTS

| | | | |
|---|---|---|---|
| 5,276,440 | 1/1994 | Jolissaint et al. | 340/825.02 |
| 5,388,243 | 2/1995 | Glider et al. | 395/425 |
| 5,586,254 | 12/1996 | Kondo et al. | 395/200.1 |
| 5,761,429 | 6/1998 | Thompson et al. | 395/200.54 |
| 5,796,718 | 8/1998 | Caterisano | 370/217 |
| 5,872,904 | 2/1999 | McMillen et al. | 395/182.02 |

*Primary Examiner*—Douglas W. Olms
*Assistant Examiner*—David R Vincent

[57] ABSTRACT

An improved network restoration system is provided that determines when a transitory condition, like a jeopardy situation, occurs that will likely affect network traffic. Upon making such a determination, the improved network restoration system regenerates the plans affected by the transitory condition using the most up-to-date topology information. As a result, the improved network restoration system performs preplanning for a transitory condition so that when a network failure occurs due to the transitory condition, network restoration occurs quickly. Furthermore, by regenerating the plans using the most up-to-date topology information, this network restoration is ensured to succeed.

20 Claims, 6 Drawing Sheets

NETWORK RESTORATION PLAN REGENERATION RESPONSIVE TO TRANSITORY CONDITIONS LIKELY TO AFFECT NETWORK TRAFFIC

TECHNICAL FIELD

The present invention relates generally to data processing systems and, more particularly, to network restoration plan regeneration that is responsive to transitory conditions that are likely to affect network traffic.

BACKGROUND OF THE INVENTION

Communications networks sometimes experience network failures. For example, either a network node, such as a digital cross-connect switch (DXC), may fail or a trunk, like a fiber optic cable, that connects two nodes may fail. Such network failures may result from a variety of circumstances, including mechanical failure, operator error, or environmental conditions, like an earthquake, which may render a network component inoperable.

To quickly reroute the network traffic around a network failure, network restoration systems have been developed. These systems generate restoration plans ("plans") which contain instructions for rerouting network traffic around a network failure. This rerouting around a network failure is sometimes referred to as "restoring the network." By preplanning network restoration, the time necessary for rerouting network traffic is greatly reduced, which lessens the negative impact of a network failure on network traffic. For example, FIG. 1 depicts a network 100 comprising nodes 102–106 and trunks 108–112, which interconnect the nodes. With respect to the network 100, a plan for the failure of trunk 112, which prevents the direct transfer of traffic from node A to node C, may be as follows: (1) disconnect node A and node C, (2) connect node A with node B such that traffic may be transferred over trunk 108, and (3) connect node B with node C such that traffic may be transferred over trunk 110. "Connecting two nodes" refers to either automatically or manually indicating to the two nodes that they may communicate with each other over the trunk that interconnects the nodes. After two nodes have received such an indication, each node expects to receive data from the other, and each node is prepared to negotiate to exchange data using a predesignated protocol. When two nodes are disconnected either manually or automatically, the nodes no longer attempt to exchange data over the trunk that interconnects the nodes. Once this example plan has been implemented, network traffic will circumvent the failed trunk 112 and will instead be routed between nodes A and node C via node B, so that devices connected to node A can communicate with devices connected to node B.

Conventional network restoration systems create plans to prepare for a trunk failure, a node failure, or a network failure that will affect a number of trunks and nodes. These network restoration systems create plans for a particular failure (e.g. a trunk) by first examining the available spare network segments that may be used to route traffic around the failed trunk. A network segment is a path in the network formed by one or more contiguous trunks and the nodes that interconnect those trunks. Many networks, such as the public telephone network, have two types of network segments: a traffic segment, which is a network segment used for traffic during normal operations of the network, and a spare segment, which is a segment not typically used for network traffic during normal operations of the network, but which is instead used in the event of a network failure to circumvent traffic around the network component that failed. After examining the available spare network segments, the network restoration system selects the best spare segment based on a number of factors, including which spare segment spans the shortest distance, which spare segment has the greatest bandwidth, and which spare segment has the least amount of network traffic.

Conventional network restoration systems continually update the plans for a network to ensure that the plans are current. That is, for each node and trunk in the network, the network restoration system generates a plan for that network component, and when it is completed with all of the network components, the network restoration system immediately starts over again. In a large network, like the public telephone network, there may be between 800 and 1500 plans in existence at any given time, which may require up to three days to regenerate. However, during this time, the conditions in which the network operates may have changed, which may render the plans invalid. For example, a topology change may occur which removes a segment from the network, thus rendering the plans that utilizes this segment invalid. In this situation, if an invalid plan were used before it was regenerated with the latest topology information, the network restoration would fail and network traffic would be significantly impacted by the network failure.

Another drawback to conventional network restoration systems is, they are not responsive to transitory conditions that will likely affect network traffic. One such transitory condition is a jeopardy situation in which an environmental condition will likely cause a network failure. A jeopardy situation may include any of the following situations: an earthquake in the vicinity of a number of network components, a train derailing and falling onto a fiber optic cable, a forest fire in progress which is near various network components, and two fiber optic cables laid near a construction site where one has already broken. In all of these situations, a condition external to the network renders it likely that a network failure will occur. However, conventional network restoration systems do nothing to prepare for a network failure during a jeopardy situation, and when a network failure occurs, the plans may fail because they are invalid. It is thus desirable to improve network restoration systems.

SUMMARY OF THE INVENTION

An improved network restoration system is provided that determines when a transitory condition, like a jeopardy situation, occurs that will likely affect network traffic. Upon making such a determination, the improved network restoration system regenerates the plans affected by the transitory condition using the most up-to-date topology information. As a result, the improved network restoration system performs preplanning for a transitory condition so that when a network failure occurs due to the transitory condition, network restoration occurs quickly. Furthermore, by regenerating the plans using the most up-to-date topology information, this network restoration is ensured to succeed.

In accordance with a first aspect of the present invention, a method is provided in a data processing system having plans for rerouting network traffic around a network failure in a network. This method determines whether a transitory condition has occurred such that the network failure becomes likely, and when it is determined that the transitory condition has occurred, this method regenerates a plan to reroute traffic around the network failure based on a current topology of the network.

In accordance with a second aspect of present invention, a method is provided in a data processing system for generating plans for rerouting traffic around a network failure in a network having network components. The network components each have an associated plan for rerouting traffic around the network component when the network component fails. This method receives an indication of a geographic region and determines which network components are within the indicated geographic region. Furthermore, this method determines plans associated with these network components and regenerates the plans for rerouting traffic around the network components.

In accordance with a third aspect of the present invention, a computer-readable medium is provided whose contents control a data processing system to perform a method. The data processing system has plans for rerouting traffic around a network failure in a network having network components, where each network component is associated with a plan. This method receives an indication that a network failure is likely to occur based upon a jeopardy situation and determines network components that will be affected by the network failure. Additionally, this method determines plans associated with the determined network components and repeatedly regenerates the determined plans until the jeopardy situation clears.

In accordance with a fourth aspect of the present invention, a data processing system is provided for managing restoration of a network with network components. The data processing system contains a secondary storage device, a memory, and a processor. The secondary storage device contains a topology database having current topology information for the network and a plan database having a plurality of plans. Each plan reroutes traffic around an associated network component when the associated network component fails. The secondary storage device also contains a plan table containing an entry for each plan, with each entry containing a reference to the plan and geographic coordinates of a location of the network component associated with the plan. The memory contains a jeopardy management component for receiving geographic coordinates indicating a jeopardy region in which a jeopardy situation has occurred, for accessing the plan table to determine plans for network components within the jeopardy region, for accessing the determined plans from the plan database, and for regenerating the determined plans based on the current topology information in the topology database. The processor runs the jeopardy management component.

DETAILED DESCRIPTION OF THE INVENTION

An exemplary embodiment of the present invention provides an improved network restoration system that generates plans responsive to transitory conditions likely to affect network traffic. For example, when a jeopardy situation occurs, the improved network restoration system regenerates the plans for the network components that are affected by the jeopardy situation using the most up-to-date topology information for the network. By performing this preplanning in the likely event of a network failure, the improved network restoration system restores the network quickly and efficiently, using plans that are ensured to be valid.

Figure 1:
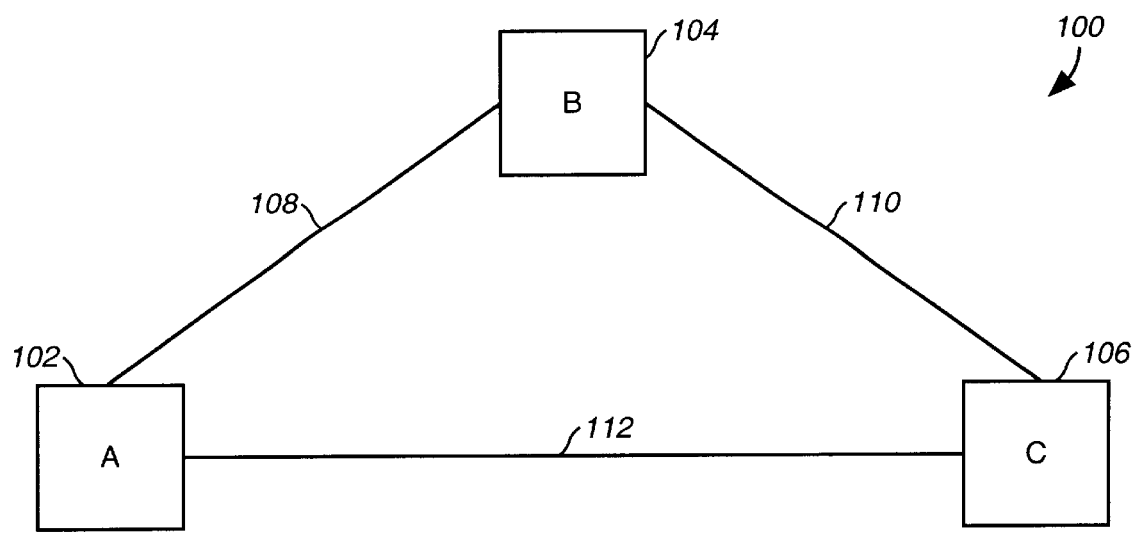
FIG. 1 depicts a conventional network containing nodes and trunks.
Figure 2:
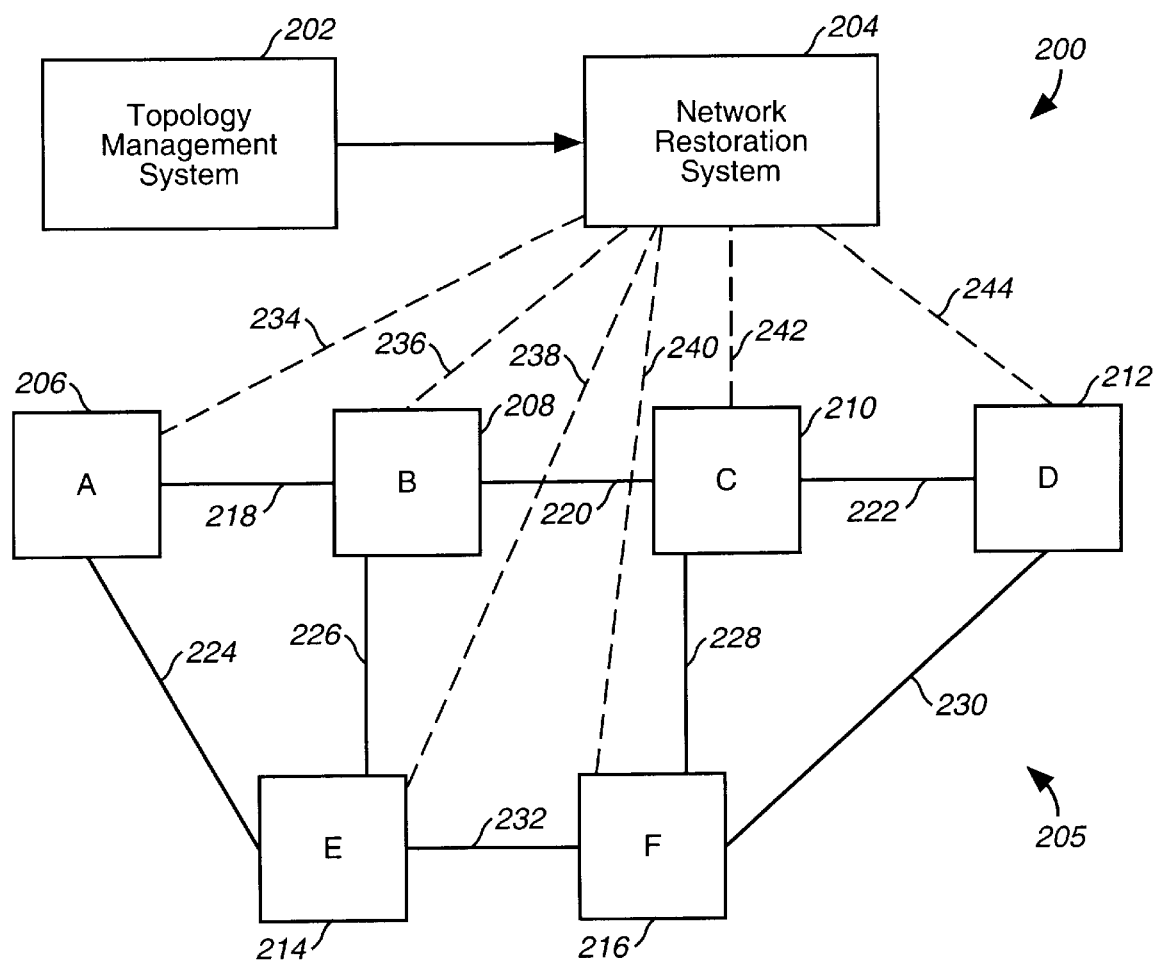
FIG. 2 depicts a data processing system that is suitable for practicing an exemplary embodiment of the present invention.

FIG. 2 depicts a data processing system 200 that is suitable for practicing an exemplary embodiment of the present invention. The data processing system 200 comprises a topology management system 202, a network restoration system 204, and a network 205. The topology management system 202 contains current topology information for the network 205. The network restoration system 204 is responsible for querying the topology management system 202 to obtain the most up-to-date topology of the network, for generating plans to reroute traffic around a network failure based on the most up-to-date topology information, and for implementing the plan when a network failure occurs by issuing the instructions in the plan via X.25 connections 234–244. The network 205 comprises a number of nodes 206–216, such as DXCs, which are interconnected via trunks 218–232, such as fiber optic cables.

Figure 3:
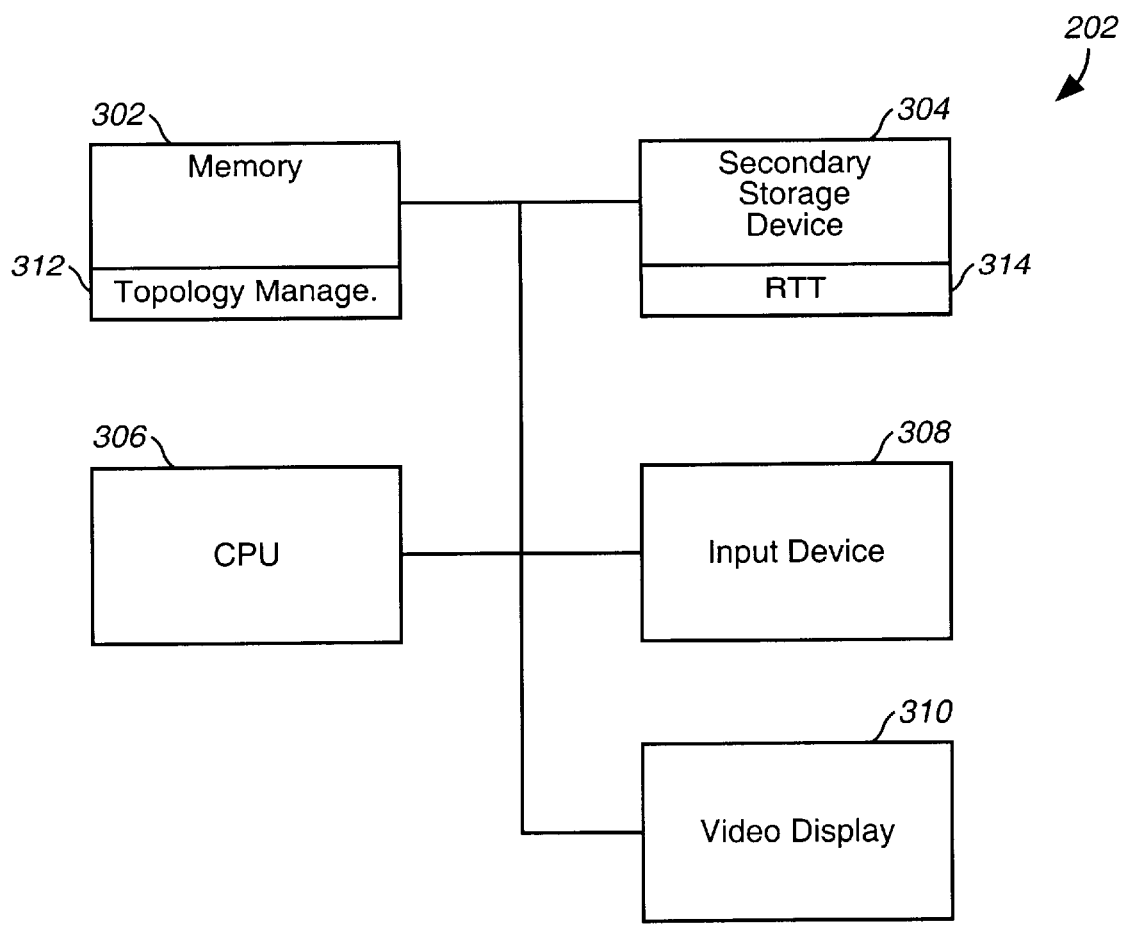
FIG. 3 depicts a more detailed diagram of the topology management system depicted in FIG. 2.

FIG. 3 depicts a more detailed diagram of the topology management system 202 of an exemplary embodiment of the present invention. The topology management system 202 contains a memory 302, a secondary storage device 304, a central processing unit (CPU) 306, an input device 308, and a video display 310. The memory 302 contains a topology manager program 312, which manages the real-time topology database (RTT) 314 on the secondary storage device 304. The RTT 314 is a database containing records which indicate the current topology of the network. For example, a record for a particular trunk indicates the nodes that it interconnects. The RTT 314 contains the most up-to-date topology information for the network, because when a topology change occurs, the network administrator updates the RTT to reflect the change. The RTT 314 also contains records for network segments, which contain a number of contiguous trunks and nodes that form a path. When managing the RTT 314, the topology manager program 312 receives and processes queries for the most up-to-date topology information. Although the RTT 314 and the topology manager are depicted as being stored on a computer that is separate from the network restoration system 204, one skilled in the art will appreciate that they may alternatively be stored on the secondary storage device of the network restoration system.

Figure 4:
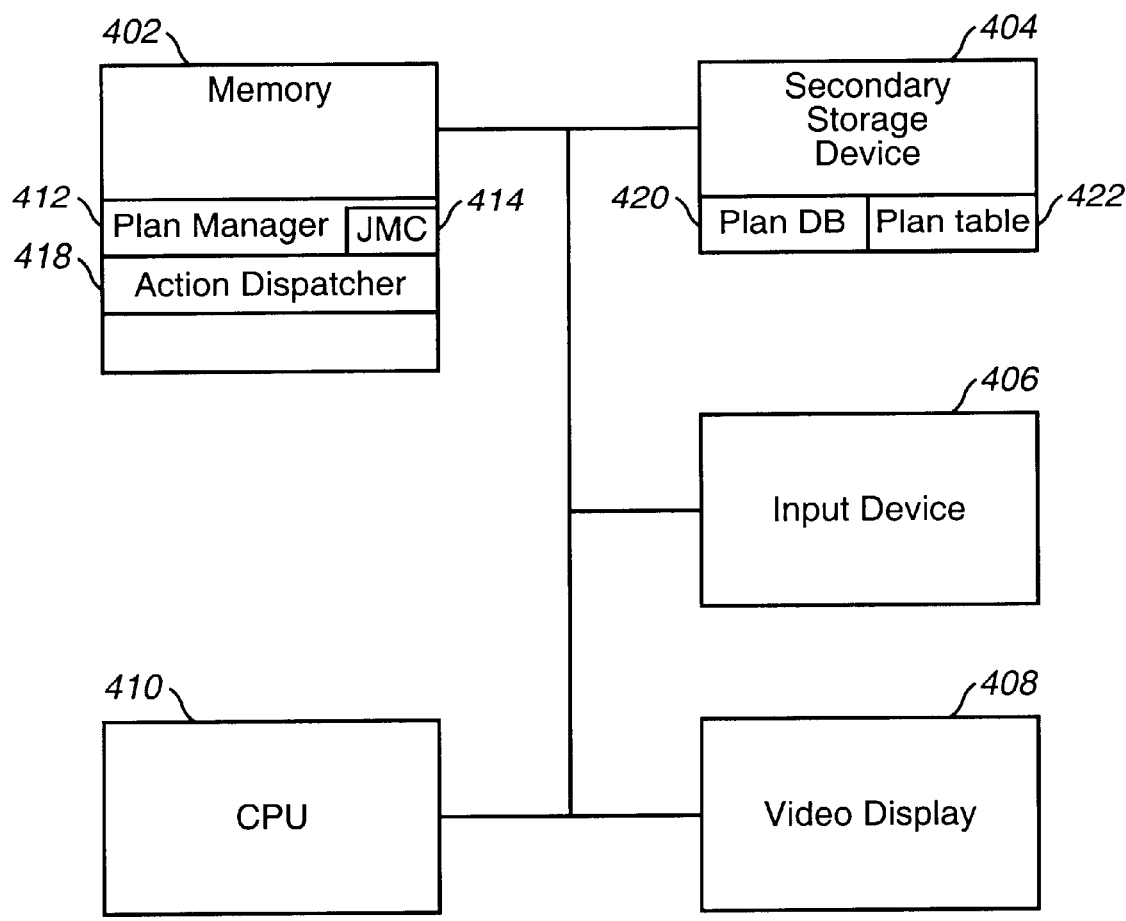
FIG. 4 depicts a more detailed diagram of the network restoration system depicted in FIG. 2.

FIG. 4 depicts a more detailed diagram of the network restoration system 204 of an exemplary embodiment of the present invention. The network restoration system 204 contains a memory 402, a secondary storage device 404, an input device 406, a video display 408, and a CPU 410. The memory 402 contains a plan manager 412 and an action dispatcher 418. The plan manager 412 contains a jeopardy management component 414. The secondary storage device 404 contains a plan database 420, which contains all of the plans used for restoring the network from a network failure. Each of the plans in the plan database 420 is associated with a network component. The secondary storage device 404 also contains a plan table 422, which contains an entry for each plan in the plan database. Each entry in the plan table 422 contains an identifier of the plan with which the entry is associated as well as the geographic coordinates of the location of the network component associated with the plan.

For example, one entry in the plan table 422 may contain an indication of "123" and geographic coordinates 38° north and 104° west. This entry indicates that plan 123 is for a network component located at 38° north and 104° west.

The plan manager 412 is responsible for performing restoration. Specifically, when a network failure occurs, the plan manager 412 implements a plan by accessing the plan database 420 to obtain the plan for the network component that failed and by passing this plan to the action dispatcher 418, which then issues the instructions contained within the plan to the nodes in the network via the X.25 connections. One skilled in the art will appreciate that upon receiving an instruction, the node may automatically implement the instruction (e.g., perform a connect), or alternatively, the instruction may be sent to the network administrator for manual implementation. The jeopardy management component 414 of the plan manager 412 receives an indication of a jeopardy situation from a network administrator, determines which of the plans may be affected by the jeopardy situation by accessing the plan table 422 and the plan database 420, and then regenerates these plans using the most up-to-date topology information contained in the RTT 314. A plan is "affected" by a jeopardy situation when the network component is within a geographic area specified by the network administrator that is likely to be affected by the jeopardy situation. The network restoration system in which an exemplary embodiment operates is further described in copending U.S. patent application Ser. No. 08/775,553, entitled "Method and Apparatus for Identifying Restoral Routes in a Network" and copending U.S. patent application Ser. No. 08/753,558, entitled "Method and Apparatus for Deriving and Representing Physical Network Topology," which are both hereby incorporated by reference.

Figure 5:
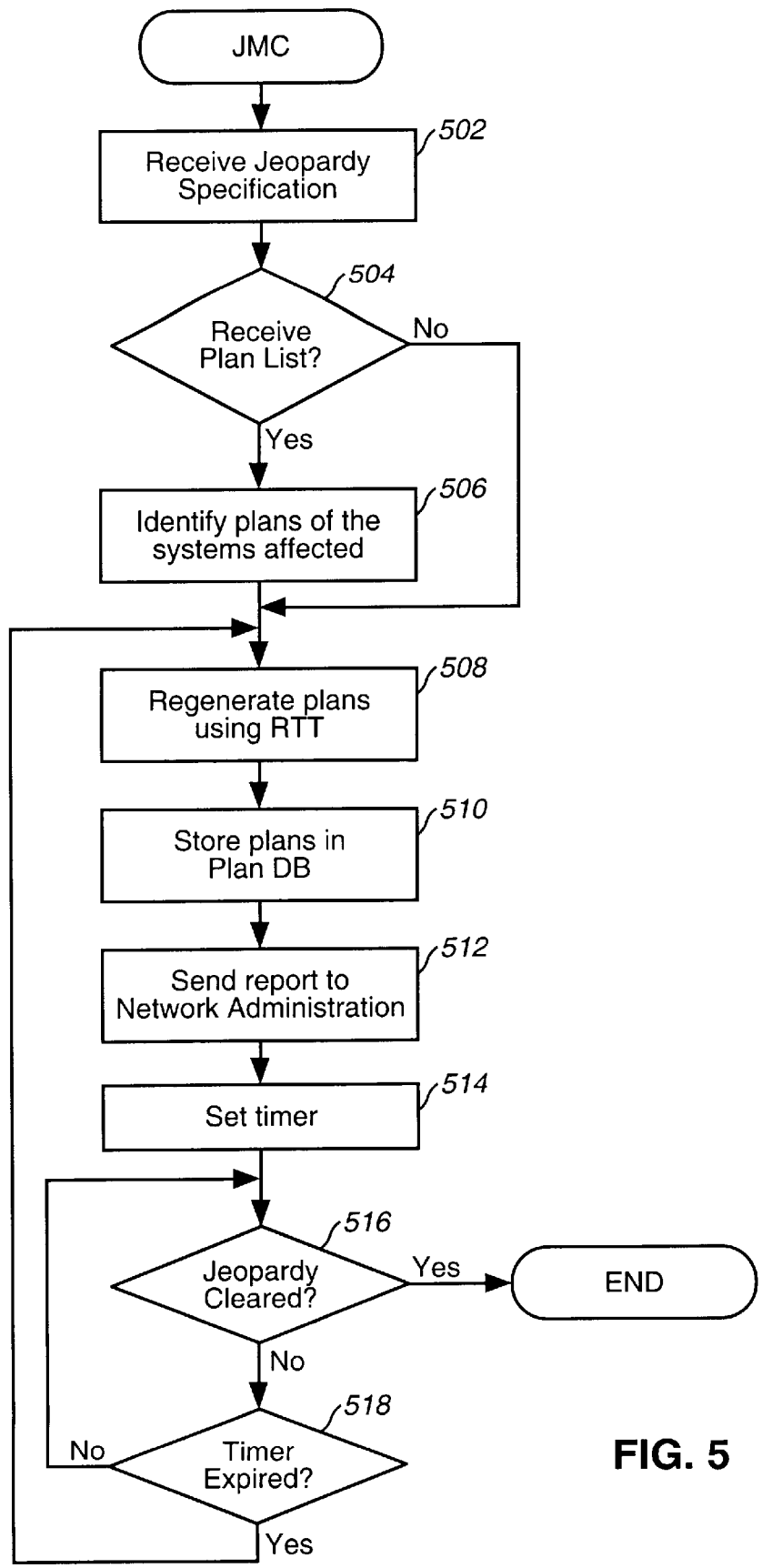
FIG. 5 depicts a flowchart of the steps performed by the jeopardy management component depicted in FIG. 2.
Figure 6:
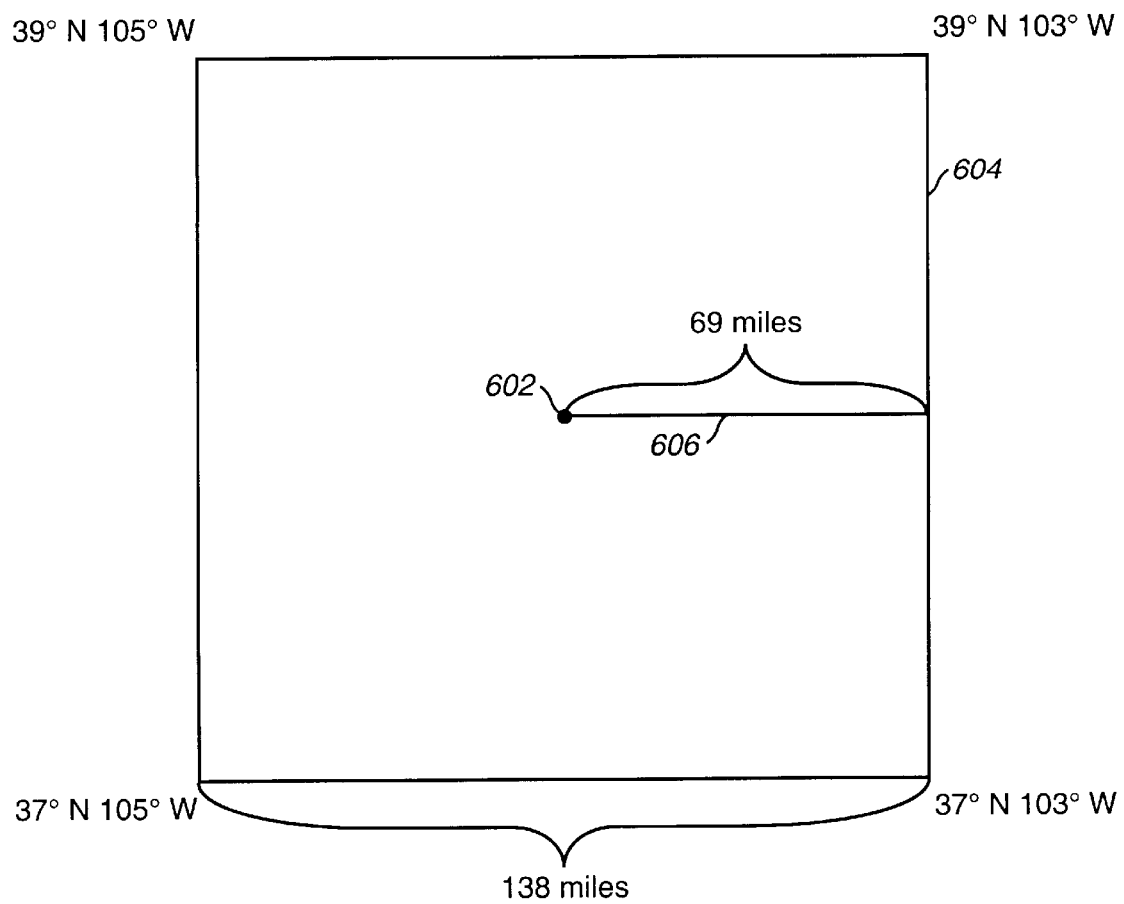
FIG. 6 depicts a jeopardy region, where the network components within this region will likely be affected by the jeopardy situation.

FIG. 5 depicts a flowchart of the steps performed by the jeopardy management component of an exemplary embodiment of the present invention. The first step performed by the jeopardy management component is to receive a jeopardy specification from the network administrator (step 502). In this step, the jeopardy management component receives (1) a timer value, discussed below, and (2) either a list of plans that are identified by the network administrator as likely affected by the jeopardy situation or geographic coordinates with a distance indication. When receiving geographic coordinates with a distance indication, for example, the jeopardy management component may receive an indication of 38° north and 104° west as well as a distance indication of 69 miles. As shown in FIG. 6, the geographic indication 602 specifies a center point of a square, known as the jeopardy region 604, which encompasses the area where the jeopardy situation is occurring. The distance indication specifies the distance 606 from the centerpoint to the edges of the square (69 miles). Using this example, the jeopardy region 604 is a square area having the following four corners: (1) 39° north, 103° west; (2) 39° north, 105° west; (3) 37° north, 103° west; and (4) 37° north, 105° west. The jeopardy region 604 is thus a square area of 138 miles by 138 miles.

After receiving the jeopardy specification, the jeopardy management component determines if it has received a plan list (step 504). If so, processing continues to step 508. However, if, instead of a plan list, a geographic indication has been provided, the jeopardy management component identifies the plans associated with the network components that are contained within the jeopardy region (step 506). It is these plans that will be affected by the jeopardy situation. In this step, the jeopardy management component accesses the plan table and identifies all plans having geographic coordinates within the jeopardy region depicted in FIG. 6. After identifying the plans that are affected by the jeopardy situation, the jeopardy management component regenerates these plans (step 508). When regenerating the plans, the jeopardy management component accesses the plan database to retrieve the plans, and for each plan, the jeopardy management component accesses the RTT to determine all alternative routes based on the current topology information. The jeopardy management component then chooses a best route based on a number of factors, such as distance, capacity, and current traffic.

After regenerating the plans, the jeopardy management component stores the plans into the plan database (step 510). This step ensures that the regenerated plans will be the ones used when a network failure occurs. After storing the plans in the plan database, the jeopardy management component sends a report to the network administrator indicating the number of plans regenerated and the types of network components affected by the jeopardy situation (step 512).

Next, the jeopardy management component sets a timer to the timer value received in step 502 (step 514). This timer value indicates how often the plans should be regenerated while the jeopardy situation is in effect and has not cleared (e.g., 1 hour). After setting the timer, the jeopardy management component determines if the jeopardy situation has cleared (step 516). In this step, the jeopardy management component will receive a notification from the network administrator indicating that the jeopardy situation has cleared (e.g., the forest fire has been extinguished). If the jeopardy situation has cleared, processing ends. However, if the jeopardy situation has not cleared, the jeopardy management component determines if the timer has expired (step 518). If the timer has expired, processing continues to step 508 where the plans are regenerated using the most up-to-date topology information. If the timer has not expired, processing continues to step 516.

While the present invention has been described with reference to a preferred embodiment thereof, those skilled in the art will know of various changes in form and detail that may be made without departing from the spirit and scope of the present invention as defined in the appended claims.

What is claimed is:

1. A method in a data processing system having plans for rerouting network traffic around a network failure in a network having a current topology, comprising the steps of:

determining whether a transitory condition has occurred such that the network failure becomes likely; and when it is determined that the transitory condition has occurred, regenerating a plan to reroute traffic around the network failure based on the current topology of the network.

2. The method of claim 1 wherein the regenerating step includes determining affected plans which are plans affected by the network failure and regenerating the affected plans.

3. The method of claim 2 wherein the step of determining affected plans includes receiving identifiers of the affected plans.

4. The method of claim 2 wherein each plan is associated with a network component, wherein the step of determining affected plans includes receiving geographic coordinates indicating a location of the transitory condition, determining network components at the location, and identifying the plans associated with the determined network components.

5. The method of claim 4 wherein the step of receiving geographic coordinates includes receiving a distance indication and wherein the step of determining network components includes determining which network components are within a distance specified by the distance indication from the location.

6. A method in a data processing system for generating plans for rerouting traffic around a network failure in a network having network components, the network components each having an associated plan for rerouting traffic around the network component when the network component fails, comprising the steps of:

receiving an indication of a geographic region;

determining network components within the indicated geographic region;

determining plans associated with the determined network components; and regenerating the determined plans for rerouting traffic around the determined network components.

7. The method of claim 6 wherein the step of regenerating includes determining a current topology of the network and regenerating the determined plans based on the current topology.

8. The method of claim 6 wherein the step of receiving an indication includes the step of receiving an indication of a jeopardy region that is subject to a jeopardy situation such that network components within the jeopardy region are likely to experience a failure.

9. The method of claim 8 wherein the regenerating step is performed repeatedly until the jeopardy situation clears.

10. The method of claim 8 wherein the step of receiving an indication includes receiving a timer value, wherein the method includes the step of setting a timer to the timer value before the regenerating step, and wherein the regenerating step includes regenerating the determined plans responsive to an expiration of the timer.

11. A computer-readable medium whose contents control a data processing system to perform a method, the data processing system having plans for rerouting traffic around a network failure in a network having network components, each network component associated with a plan, the method comprising the steps of:

receiving an indication that a network failure is likely to occur based upon a jeopardy situation;

determining network components that will be affected by the network failure;

determining plans associated with the determined network components; and repeatedly regenerating the determined plans until the jeopardy situation clears.

12. The computer-readable medium of claim 11 wherein the step of receiving an indication includes receiving an indication of a geographic region in which the jeopardy situation is located and wherein the step of determining network components includes determining which of the network components reside within the geographic region.

13. The computer-readable medium of claim 11 wherein the step of receiving includes receiving a list of the plans associated with the determined network components.

14. The computer-readable medium of claim 11 wherein the step of receiving an indication includes receiving a timer value and wherein the method includes setting a timer to the timer value before the repeatedly regenerating step and wherein the repeatedly regenerating step includes regenerating the determined plans when the timer expires.

15. A data processing system for managing restoration of a network with network components, comprising:

a secondary storage device further comprising:

a topology database having current topology information for the network;

a plan database having a plurality of plans, each plan for rerouting traffic around an associated network component when the associated network component fails; and a plan table containing an entry for each plan, each entry containing a reference to the plan and geographic coordinates of a location of the network component associated with the plan;

a memory containing a jeopardy management component for receiving geographic coordinates indicating a jeopardy region in which a jeopardy situation has occurred, for accessing the plan table to determine plans for network components within the jeopardy region, for accessing the determined plans from the plan database, and for regenerating the determined plans based on the current topology information in the topology database; and a processor for running the jeopardy management component.

16. The data processing system of claim 15 wherein the jeopardy management component repeatedly regenerates the determined plans until the jeopardy situation clears.

17. The data processing system of claim 15 wherein the jeopardy management component receives a timer value, sets a timer to the timer value, and regenerates the determined plans when the timer expires.

18. The data processing system of claim 15 wherein the memory further includes an action dispatcher for implementing a plan for a failed network component to reroute traffic around the failed network component.

19. The data processing system of claim 15 wherein the jeopardy management component receives a list of plans that are likely affected by the jeopardy situation and wherein the jeopardy management component regenerates the plans in the list of plans.

20. The data processing system of claim 15 wherein the jeopardy management component sends a report to a user after regenerating the determined plans, wherein the report indicates the plans regenerated.

* * * * *